United States Patent Office

2,846,304
Patented Aug. 5, 1958

2,846,304

METHOD OF PRODUCING TITANIUM

Wayne H. Keller, Waban, and Irwin S. Zonis, Belmont, Mass., assignors to National Research Corporation, Cambridge, Mass., a corporation of Massachusetts No Drawing. Application June 4, 1954
Serial No. 434,648

9 Claims. (Cl. 75—84.5)

This invention relates to the production of titanium and more particularly to the production of titanium by a process wherein a titanium compound is dissolved in a fused salt and is reduced to crystalline titanium metal by the addition of a molten reducing agent. This application is, in part, a continuation of our copending application Serial No. 373,512, filed August 11, 1953.

A principal object of the present invention is to provide an improved process for producing high yields of crystalline titanium by the reduction of a titanium chloride dissolved in a fused salt.

Another object of the invention is to provide a process of the above type which is simple and cheap to operate and gives a product which can be water leached to separate the titanium crystals from the by-product salt.

Other objects of the invention will in part be obvious and will in part appear hereinafter.

The invention accordingly comprises the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

In the present invention, advantage is taken of the well-known ability of the alkali and alkaline earth metals to reduce titanium tetrachloride, for example, to titanium metal. This reaction proceeds rapidly at relatively low temperatures (i. e., temperatures on the order of the melting point of the by-product halide). However, in the present invention the reaction conditions are so adjusted that the product titanium consists of crystals of titanium which have a size sufficiently large so as to permit simple leaching with water (containing a small percentage of acid) to dissolve the by-product halide. The size of the individual crystals is such that the surface-to-volume ratio is relatively low, thereby preventing contamination of the product due to the presence of surface oxide. The nature of the product is also such that its surface activity appears to be very low.

In accordance with the present invention, a titanium compound to be reduced, preferably a lower halide, is dissolved in a fused salt and is reduced to titanium metal by addition of a reducing agent such as sodium, potassium, magnesium and the like.

We have discovered that in such a system crystal growth is strongly promoted if the reducing agent be supplied to the titanium halide fused salt solution via an interposed shielding layer of fused salt which is substantially free of the titanium halide and which is preferably localized by, and at least in part incorporated in, a solid porous diaphragm which is in direct contact with the solution. We have also found that such shielding layer and porous diaphragm can be established and maintained by proper control of the condition of the bath and of the manner of supplying the reducing agent thereto.

For example, in a preferred practice of the invention, a solution of titanium trichloride and titanium dichloride in fused sodium chloride is provided in a reactor and liquid sodium is fed to the surface of the molten salt solution as a thin film distributed substantially uniformly over the surface while the fused salt solution remains quiescent. Under these conditions, a crust of sintered, fine titanium particles forms rapidly at the surface of the salt bath extending over said surface and adhering to the walls of the reactor and to any other apparatus elements adjacent the surface of the bath. This crust is porous and incorporates a layer of fused salt which is substantially free of titanium chloride at least adjacent and above the top of the crust.

As the process continues, the level of the salt bath will rise due to the manufacture of more by-product salt but the crust remains where it was formed, adhered to the walls of the reactor, and the titanium crust becomes covered by a layer of molten salt which (due to stratification and diffusion limitations placed on the contents of the bath due to the presence of the crust) is substantially free of titanium chloride. Consequently, further feed of sodium is to the surface of this titanium-chloride-free layer of salt above the titanium crust.

When the crust and shielding layer of titanium-halide-free salt have been established, titanium crystals begin to form, growing out of the under surface of the crust and outwardly from the walls of the reactor. The production of titanium fines, such as initially form the crust, decreases substantially.

The feed of sodium is preferably continued until sufficient sodium has been fed to reduce substantially all of the dissolved titanium chloride to titanium metal. The sodium feed rate is also preferably maintained at less than about five pounds per hour per square foot of salt bath surface. This feed rate is preferably on the order of two pounds or less of sodium per hour per square foot of reactor surface at the start of the reduction of the solution of lower titanium chlorides. It is also preferred that the lower chloride solution be relatively concentrated at the start of the reduction so as to assist in forming a self-supporting, porous initial crust. After the crust and titanium-chloride-free salt layer have been formed, the feed rate of sodium to the reactor can be considerably increased, if desired. However, from the standpoint of mechanical simplicity and safety, a constant, relatively slow rate of feed of sodium is preferred.

After the sodium feed is stopped, the reactor is allowed to cool and the solidified contents are leached by means of acidified water, thus removing the salt. The remaining product consists essentially of a mass of loosely adherent, interlaced crystals of titanium extending downwardly from the crust layer of sintered titanium particles and outwardly from the reactor walls.

It will be evident from the foregoing that the porous diaphragm, which in the example just described is formed of sintered titanium fines, performs two major functions. First, it helps to segregate the fused salt layer low in titanium chloride. Second, it forms a supporting stratum from which the crystals may grow.

In order to describe more fully preferred methods of practicing the invention, there are set forth below three non-limiting examples which are merely illustrative of numerous additional embodiments of the invention. In these examples, the process was carried out in a nickel reactor having a diameter of 12 inches and a height of 27 inches. The reactor had a water-cooled head and was equipped with a stirrer for agitating the salt bath in the reactor. A feed tube was provided for feeding liquid titanium tetrachloride below the surface of the bath and another feed tube was included for feeding sodium to the surface of the bath. Temperatures were indicated by thermocouples positioned within the salt charge. An atmosphere of argon was maintained in the reactor during the runs.

*Example I*

39.5 pounds of sodium chloride were charged into the reactor. All air was removed from the reactor and an atmosphere of argon introduced therein. Sodium and titanium tetrachloride were introduced for 1 hour and 11 minutes at the rate of 7.4 pounds and 37 pounds per hour respectively so as to produce a solution of titanium trichloride and dichloride in sodium chloride. The initial reduction was carried out at a temperature of about 900° C. with agitation of the bath. The introduction of titanium tetrachloride was then stopped and liquid sodium was fed in a fine stream to the surface of the salt bath at a rate of 2 pounds of sodium per square foot of salt bath surface per hour. This feed was continued for 6½ hours. During this time, the bath was allowed to remain essentially quiescent although some slight thermal currents may have been present. The charge was allowed to cool and the resultant product was leached by means of acidified water. The leached product had a crust of sintered titanium fines at the top which was thicker under the point of sodium addition. This crust was adhered to and supported by the reactor walls and also the agitator shaft, thermocouple well and titanium tetrachloride feed tube within the reactor. Beneath the crust was the characteristic crystal structure of titanium. A number of the product crystals had a length of one inch or longer and an average thickness of $\frac{1}{16}$ inch. A representative sample of 72% of the resultant titanium crystals were arc melted in an inert atmosphere to form buttons. These buttons had a Rockwell A hardness of less than 56. Of the total titanium produced, 57% had a Rockwell A hardness of 49 or less.

*Example II*

This run was almost identical to Example I except that no agitation of the salt bath was employed during the reduction of the tetrachloride and a serrated rotatable titanium disc was mounted above the bath for distributing the sodium. During the operation, the sodium was fed to this disc, as it rotated, to spray the sodium substantially uniformly over the surface of the bath. This rotatable disc is more fully described and claimed in the copending application of Hellier, Serial No. 442,525, filed July 12, 1954, now abandoned. The crust of sintered titanium fines was thinner, substantially planar and more uniform than in the case of Example I. It was located below the upper level of salt. Since less crust was formed, a larger percentage of the total product was in the form of unsintered, relatively large crystals.

*Example III*

This run was almost identical to Example II except for the fact that the reactor was maintained at temperature (i. e., 900° C.) for 6 hours after cessation of the sodium feed. This holding period provided for substantially complete reduction of all of the dissolved titanium chloride in the salt bath. The product from this run was very similar to that of Example II.

While several specific examples have been given above, numerous alternative methods may be employed without departing from the spirit of the invention. The temperature of the reaction mass may be varied widely from slightly above the melting point of the salt to temperatures on the order of 1000° C. and above. Numerous reducing agents other than the sodium may be employed. For example, potassium, calcium, magnesium, lithium and various combinations of these elements may be utilized. The expression "alkaline earth metals" used in the claims is intended to include magnesium. From the standpoint of cheapness, sodium or magnesium is preferred. Other halides of titanium may be utilized although, from the standpoint of cost, ease of handling, etc., the tetrachloride is most preferred.

The process, as illustrated in any of the examples, may be practiced with continuous or intermittent feed of titanium chloride, either as such or dissolved in fused salt, this feed being to a portion of the bath below the crust. In such case, an intermittent or continuous overflow of fused salt will normally be provided at a point in the reactor where the fused salt is relatively low in titanium chloride. While agitation of the bath should be minimized, particularly while the crust is forming, some circulation of the bath below the crust may be provided, particularly at later stages of the process, to facilitate complete reduction of the titanium chlorides.

Additionally, the reactor can be fed with lower halides of titanium, such as titanium trichloride, manufactured from titanium-bearing materials in the manner shown in the copending applications of Singleton, Serial No. 304,388, filed August 14, 1952, now U. S. Patent No. 2,770,541, and Singleton, Serial No. 315,461, filed October 18, 1952. Equally, titanium trichloride can be made by the technique described by Sherfey et al., Journal of Bureau of Standards 46, 299–300 April 1951. Additionally, the dichloride of titanium can be manufactured by numerous processes such as disproportionation of the trichloride or partial reduction of the trichloride or tetrachloride.

The present invention can be equally employed for the manufacture of titanium alloys by the coreduction of the chlorides, for example, of vanadium, chromium, manganese, iron, nickel, cobalt, columbium, tantalum, molybdenum, tungsten or silicon. The alloy may be a binary alloy or it may be an alloy containing 3 or 4 constituents. In the manufacture of alloys, the same general conditions of the slow reduction of the titanium halide and reducible compounds of the alloying constituents must be employed. Accordingly, when the expression "titanium" is used in the appended claims, it is intended to include alloys of titanium as well as pure titanium.

It should be additionally pointed out that the salt mixture in which the reduction is carried out may be formed of numerous halides which can be mixed halides, single halides and halides of materials other than the specific reducing agent or agents employed in the reaction. From the standpoint of simplicity of operation and ease of control, it is preferred, however, that the salt be the chloride of the reducing agent. Thus it is quite feasible to employ binary and ternary mixtures of halides having quite low melting points.

It should be pointed out, in connection with a consideration of the various salts which can be employed, that these salts should be completely anhydrous and free of any contaminants such as carbon, nitrogen, oxygen or hydrogen. This is due to the tremendous reactivity of titanium metal at temperatures on the order of 800° C. to 900° C. and above.

In the above specification, reference has been made particularly to the preferred titanium chlorides, tetrachloride and dichloride. In most instances, the trichloride is equally useful and, as a matter of fact, it is extremely unlikely that any system having an appreciable concentration of one of the lower chlorides of titanium will not have at least some of the other lower chloride also present. It should be apparent that one can also employ the corresponding di-, tri- and tetra-halides from the group consisting of the iodides, bromides and fluorides of titanium.

Since certain changes may be made in the above process without departing from the scope of the invention herein involved, it is intended that all matter contained in the above description shall be interpreted as illustrative and not in a limiting sense.

What is claimed is:

1. In a process for producing titanium wherein a halide of titanium is dissolved in a fused salt bath and is reduced to titanium crystals by means of a metallic reducing agent selected from the class consisting of the alkali metals and the alkaline earth metals, the molten salt comprising a halide selected from the group consisting of the alkali metal halides and the alkaline earth metal halides, the improvement which comprises adding said reducing agent to the surface of the fused salt bath to initially form a titanium crust on said bath, and thereafter feeding said reducing agent to the upper surface of a layer of fused salt above the crust, the layer of fused salt above the crust being essentially free of dissolved titanium halide and the amount of said reducing agent fed being sufficient to reduce substantially all of the contained titanium halide to titanium metal, and maintaining said fused salt molten until substantially all of the contained titanium halide is reduced.

2. In a process for manufacturing titanium wherein a solution of a lower chloride of titanium in a molten salt is reduced to metallic titanium by means of a liquid metal reducing agent, the reducing agent being selected from the class consisting of the alkali metals and the alkaline earth metals, the improvement which comprises uniformly distributing the reducing agent across the surface of the molten salt to form an initial crust of sintered titanium particles on the surface of the salt, feeding more reducing agent to the upper surface of the molten salt bath, and supporting the titanium crust adjacent the surface of the salt bath during reduction of further titanium chloride within the salt bath, the layer of fused salt above the crust being essentially free of dissolved titanium chloride.

3. In a process for manufacturing titanium wherein a solution of a lower chloride of titanium in a molten salt is reduced to metallic titanium by means of a liquid metal reducing agent, the reducing agent being selected from the class consisting of the alkali metals and the alkaline earth metals, the improvement which comprises uniformly distributing the reducing agent across the surface of the molten salt to form an initial crust of sintered titanium particles on the surface of the salt, feeding more reducing agent to the upper surface of the molten salt bath, and supporting the titanium crust at and intermediate its edges adjacent the surface of the salt bath during reduction of further titanium chloride within the salt bath, the layer of fused salt above the crust being essentially free of dissolved titanium chloride.

4. In a process for manufacturing titanium wherein a solution of a lower chloride of titanium in a molten salt is reduced to metallic titanium by means of a liquid metal reducing agent, the reducing agent being selected from the class consisting of the alkali metals and the alkaline earth metals, the improvement which comprises spraying said reducing agent onto the surface of the molten salt to form an initial crust of sintered titanium particles on the surface of the salt, and feeding more reducing agent to the molten salt adjacent the crust, the layer of fused salt above the crust being essentially free of dissolved titanium chloride.

5. In a process for producing titanium wherein a chloride of titanium is dissolved in a fused salt bath and is reduced to titanium crystals by means of a metallic reducing agent, the reducing agent being selected from the class consisting of the alkali metals and the alkaline earth metals, the improvement which comprises providing on the surface of the fused salt bath a layer of salt which is substantially free of titanium chlorides, and thereafter feeding to the top of said titanium-chloride-free salt layer sufficient reducing agent to reduce substantially all of the contained titanium chloride to titanium metal, and maintaining said fused salt molten until substantially all of the contained titanium chloride is reduced.

6. In a process for producing titanium wherein a lower chloride of titanium is dissolved in a fused salt bath and is reduced to titanium crystals by means of a metallic reducing agent, the reducing agent being selected from the class consisting of the alkali metals and the alkaline earth metals, the improvement which comprises adding molten reducing agent to the surface of the fused salt bath to initially form a titanium crust on said bath, and thereafter feeding said reducing agent to the upper surface of a layer of fused salt above the crust, the layer of fused salt above the crust being essentially free of dissolved titanium chloride and the amount of reducing agent fed being sufficient to reduce substantially all of the contained titanium chloride to titanium metal, and maintaining said fused salt molten until substantially all of the contained titanium chloride is reduced.

7. In a process for producing titanium wherein a halide of titanium is dissolved in a fused salt bath and is reduced to titanium crystals by means of a metallic reducing agent selected from the class consisting of the alkali metals and the alkaline earth metals, the molten salt comprising a halide selected from the group consisting of the alkali metal halides and the alkaline earth metal halides, the improvement which comprises providing on the surface of the fused salt bath a layer of salt which is substantially free of titanium halides, and thereafter feeding to the top of said titanium-halide-free salt layer sufficient of said reducing agent to reduce substantially all of the contained titanium halide to titanium metal, and maintaining said fused salt molten until substantially all of the contained titanium halide is reduced.

8. A process for manufacturing titanium wherein a titanium halide is dissolved in a bath of a fused salt and is reduced to titanium crystals by supplying a metallic reducing agent to the bath, the reducing agent comprising a metal selected from the class consisting of the alkali metals and the alkaline earth metals and the fused salt comprising a halide selected from the class consisting of the alkali metal halides and the alkaline earth metal halides, the improvement of which comprises maintaining between the supply of reducing agent and a major portion of the salt bath containing the dissolved titanium halide a zone comprising said fused salt which is substantially free of titanium halide, the reducing agent being introduced into and passed through the shielding layer to react with the titanium halide.

9. A process for manufacturing titanium wherein a titanium lower chloride is dissolved in a bath of a fused salt and is reduced to titanium crystals by supplying a metallic reducing agent to the bath, the reducing agent comprising a metal selected from the class consisting of the alkali metals and the alkaline earth metals and the fused salt comprising a halide selected from the class consisting of the alkali metal halides and the alkaline earth metal halides, the improvement of which comprises maintaining between the supply of reducing agent and the portion of the salt bath containing the dissolved titanium lower chloride a shielding layer of fused salt which is substantially free of titanium lower chloride, the reducing agent being introduced into and passed through the shielding layer to react with the titanium chloride.

References Cited in the file of this patent

UNITED STATES PATENTS

| | | |
|---|---|---|
| 2,148,345 | Freudenberg | Feb. 21, 1939 |
| 2,443,253 | Kroll et al. | June 15, 1948 |
| 2,586,134 | Winter | Feb. 19, 1952 |
| 2,607,674 | Winter | Aug. 19, 1952 |
| 2,618,549 | Glasser | Nov. 18, 1952 |
| 2,618,550 | Glasser | Nov. 18, 1952 |
| 2,647,826 | Jordan | Aug. 4, 1953 |

FOREIGN PATENTS

| | | |
|---|---|---|
| 694,921 | Great Britain | July 29, 1953 |